Nov. 15, 1966   C. J. LITZ, JR   3,285,539
GAS GENERATING SYSTEM
Filed July 8, 1965

INVENTOR.
CHARLES J. LITZ, Jr.
BY Harry M. Saragovitz
Edward J. Kelly, Herbert Berl
& S. Dubroff
ATTORNEYS 3,285,539
GAS GENERATING SYSTEM
Charles J. Litz, Jr., Philadelphia, Pa., assignor to the United States of America as represented by the Secretary of the Army
Filed July 8, 1965, Ser. No. 470,643
6 Claims. (Cl. 244—42)

The invention described herein may be manufactured and used by or for the Government for governmental purposes without the payment to me of royalty thereon.

This invention relates to gas generating apparatus and, more particularly, to gas generating system for improving the safe flight characteristics of aircraft at take off, at landing and wherever incipient stalling is encountered.

In situations where flight characteristics result in a sudden loss of lift, the demand for immediate increase in the amount of gas being produced by the system is imminent, if not present, to initiate the craft's recovery period for continued flight operation, the gas delivered being employed to reattach laminated air flow upon the wing surface of the aircraft. Where the loss of lift is gradual, the additional gas requirements are, by contrast, of less magnitude. When loss of lift does occur, there is a need for a sudden increase in gas delivery to commence the recovery period. After a short period, the gas requirement is diminished for a substantial period to enable manipulation of the controls. Thus, during the overall pilot reaction time, there is a need for delivering a controlled variable amount of gas.

One of the objects of the invention is to provide a gas generating system having a controlled variable gas delivery arrangement for improving the performance of aircraft anti-stall apparatus.

In one aspect of the invention the gas generating system includes a piston sealingly movable in a tubular housing by a rearwardly adjacent low pressure chamber to urge a forward surface of a solid propellant against a porous heat reflective gate, a high pressure chamber in the housing forward of the gate, ignition means proximate the gate for igniting the propellant forward surface, and means including a control valve for inter-communicating the high and low pressure chambers.

These and other objects, advantages and features will become apparent from the following description and accompanying drawings in which.

Figure 1:
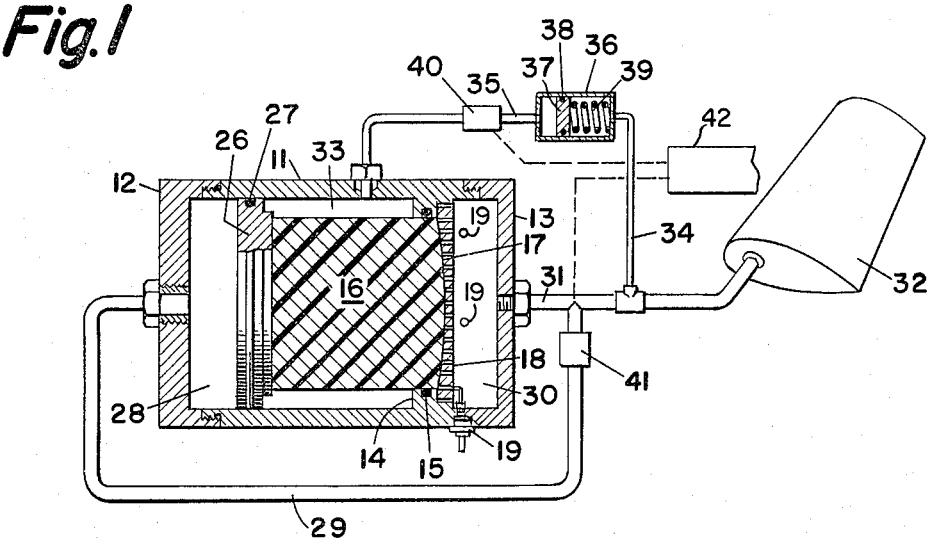
FIG. 1 is a schematic arrangement, with certain parts shown in section, of the gas generating system embodying the principles of the invention.
Figure 2:
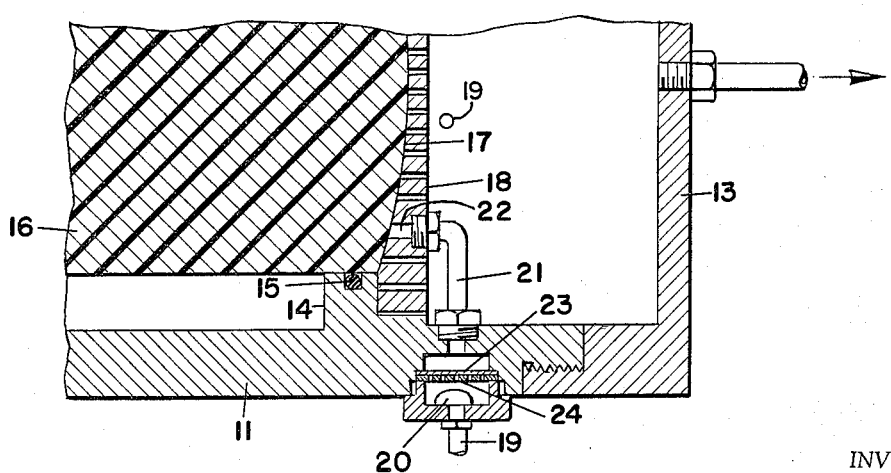
FIG. 2 is an enlarged, partial sectional view of the FIG. 1 apparatus showing the ignition system.

As seen in FIG 1 the tubular housing 11 is provided with closed end wall members 12, 13 which upon assembly are suitably secured to the housing in a sealed manner. A forward portion of the housing sidewall has an inwardly extending flange 14 whose inner circumferential face contains an O-ring seal 15 to sealingly and slidingly receive the forward lateral surface of a solid propellant 16 having a parabolic forward surface 17. The propellant 16 is of the cigarette-burning type, the burning rate of which is increased with increase of heat and/or pressure. Secured to the housing and extending across the propellant forward surface 17 is a gate or ram 18 of porous heat reflective metallic material and having a parabolic inner or rear face to mate with surface 17 and increase the reflective concentration of heat developed onto the propellant surface. The chamber forward of the gate 18 receives high pressure gases produced by the cigarette-type burning forward propellant surface 17 after it has been lit or ignited by an initiator 19, several of which preferably being provided proximate the gate 18 to enable successive propellant ignition as may be required in a multiple start-stop operation. Each initiator assembly 19 preferably includes an electrically fired igniter charge 20 (FIG. 2) and a one-way valve arrangement connected by appropriate tubing 21 to a corresponding opening 22 of gate 18, the one-way valve including a thin metallic disk or diaphragm 23 on the inner side of its multiple apertured support 24. The arrangement is such that the disk 23 ruptures only when the charge is fired.

A piston 26 having a peripheral O-ring seal 27 is slidable within the housing and is appropriately secured to the real surface of the propellant 16. The low pressure gas chamber 28 behind piston 26 is suitably connected to the high pressure chamber 30 immediately forward of gate 18 is suitably connected by a valved feed-back conduit 29 and a gas outlet line 31 which delivers the desired quantity of pressure gas to an anti-stall arrangement (not shown) in each of the craft's wings 32. The gas outlet line 31 is also connected to an annular liquid control chamber 33, surrounding the propellant 16 between flange 14 and piston 26, by gas conduit 34 and valved liquid conduit 35, conduits 34 and 35 having an interconnecting gas to liquid converter 36.

The gas to liquid converter 36 preferably includes a slidable piston 37 having a peripheral O-ring seal 38, the piston 37 being biased by spring 39 in the gas side of the converter to constantly oppose the fluid or liquid force exerted thereon by oil or other equivalent fluid in conduit 35 and the adjacent portion of the converter. The spring biased piston 37 thereby prevents any adverse bubble formation in the liquid.

Each of the solenoid valves 40, 41 in respective conduits 35 and 29, are electrically connected and functionally responsive to a loss of lift indicating arrangement 42 that is located either on the underside of the wings or proximate the pilot controls of the craft. The controlled operation of the valves 40, 41 is such that they function inversely to produce additive component or resulting changes of force upon the propellant driving piston 26, since the force upon the rear surface of piston 26 by the gas in the variable low pressure chamber 28 is opposed by the force upon the forward peripheral edge of piston 26 by the control liquid in annular chamber 33. Thus, the positive feedback force through valve 41 can be quickly reduced or even eliminated to produce a negative feedback force via chamber 33 upon the propellant carrying piston.

When the propellant forward surface 17 is ignited by one of the igniters 19, burning propellant gas is generated and delivered through the porous heat reflective gate 18 to high pressure chamber 30 and conduit 31. Actuation or further opening of gas control valve 41 admits an increase in feedback gas to chamber 28 to increase the propellant burning rate due to increased pressure and reflected heat upon propellant surface 17. Movement of solenoid valve 40 to its closed position will prevent an increase in converted liquid pressure from retarding the advance of piston 26 until controlled actuation or further opening of valve 40, the retardation of piston 26 being assisted by closing movement of solenoid valve 41.

Various modifications, changes or alterations may be resorted to without departing from the scope of the invention in the appended claims.

I claim:
1. A controlled variable gas generating system for improving safe flight characteristics of aircraft, comprising
   a substantially tubular housing having closed end walls,
   a solid propellant slidable in said housing,
   a gate of porous heat reflective metallic material secured to said housing rearwardly of a forward one of said end walls to define therebetween a forward high pressure chamber, means proximate said gate for igniting a forward surface of said propellant rearwardly adjacent said gate, a piston sealingly movable within said housing and secured to a rearward surface of said propellant, said piston being spaced from the other of said end walls to define therebetween a rearward low pressure chamber, an annular flange extending inwardly of the housing and having seal means thereon slidably engaging a forward lateral surface of said propellant, an annular control chamber surrounding said propellant between said piston and flange, means including a control valve for inter-communicating said high and low pressure chambers, and means including a second control valve for inter-communicating said control chamber with said high pressure chamber.

2. A controlled variable gas generating system for improving safe flight characteristics of aircraft, comprising a substantially tubular housing having closed end walls,
a solid propellant slidable in said housing,
a gate of porous heat reflective metallic material secured to said housing rearwardly of a forward one of said end walls to define therebetween a forward high pressure chamber, means proximate said gate for igniting a forward surface of said propellant rearwardly adjacent said gate, a piston sealingly movable within said housing and secured to a rearward surface of said propellant, said piston being spaced from the other of said end walls to define therebetween a rearward low pressure chamber, an annular flange extending inwardly of the housing and having seal means thereon slidably engaging a forward lateral surface of said propellant, an anular control liquid chamber surrounding said propellant between said piston and flange, means including a control valve for inter-communicating said high and low pressure chamber, and means including a second control valve and a gas to liquid converter for inter-communicating said control chamber with said high pressure chamber.

3. The arrangement of claim 2 wherein said converter includes a spring biased piston constantly in opposition to liquid force.

4. The arrangement of claim 2 in which each of said control valves is connected to a loss of lift indicator, and said high pressure chamber is communicatively connected to an aircraft wing.

5. The structure in accordance with claim 2 wherein said ignition means includes a plurality of igniters to successively ignite said propellant forward surface.

6. The structure in accordance with claim 2 in which said gate has a substantially parabolic rear face.

References Cited by the Examiner
UNITED STATES PATENTS

| | | | |
|---|---|---|---|
| 3,046,736 | 7/1962 | Thomson | 60—35.6 X |
| 3,105,350 | 10/1963 | Eecheuberger | 60—35.6 X |
| 3,126,704 | 3/1964 | Henderson et al. | 60—35.6 X |
| 3,149,804 | 9/1964 | Litz | 244—42 |

MILTON BUCHLER, *Primary Examiner.*

B. BELKIN, *Assistant Examiner.*